No. 873,826. PATENTED DEC. 17, 1907.
C. C. ABBOTT.
QUESTION VOTING MECHANISM.
APPLICATION FILED MAY 20, 1907.
2 SHEETS—SHEET 1.
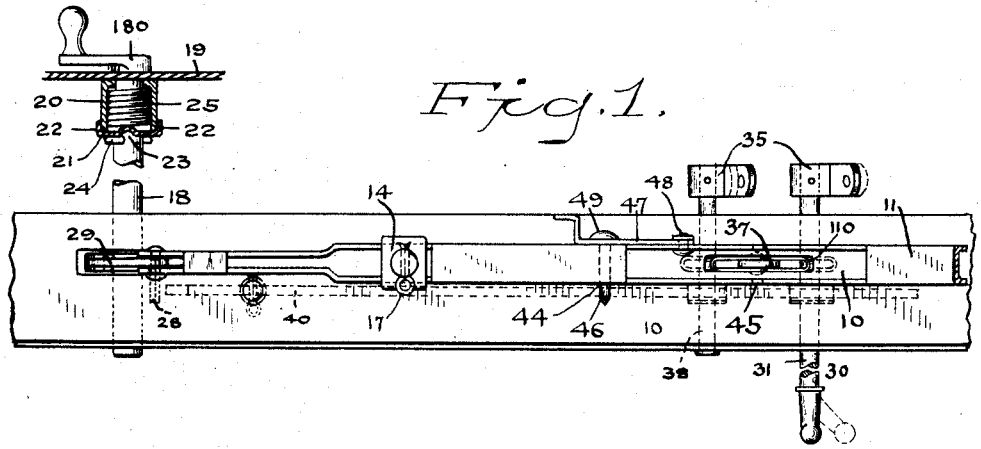
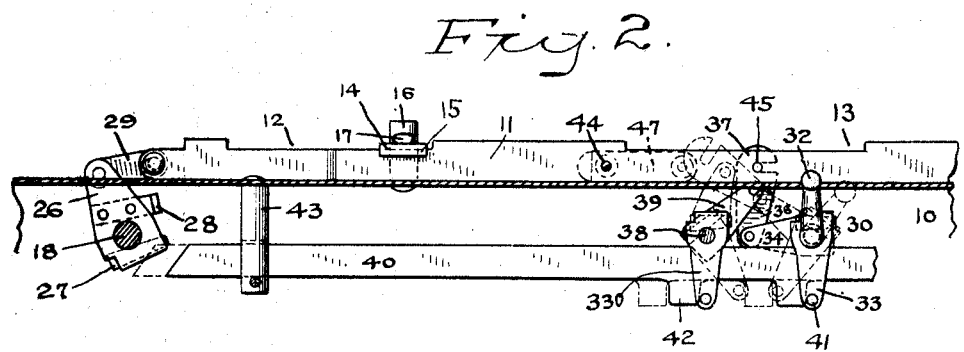
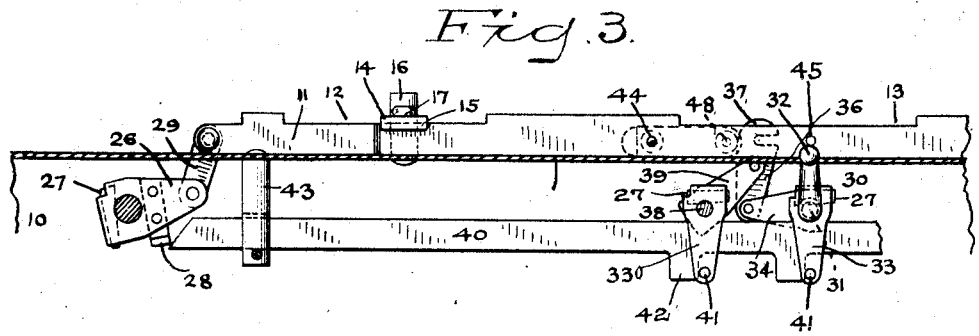
WITNESSES
H. H. Lamb.
S. W. Atherton.
INVENTOR
Charles C. Abbott
BY
A. M. Wooster
ATTORNEY No. 873,826. PATENTED DEC. 17, 1907.
C. C. ABBOTT.
QUESTION VOTING MECHANISM.
APPLICATION FILED MAY 20, 1907.
2 SHEETS—SHEET 2.
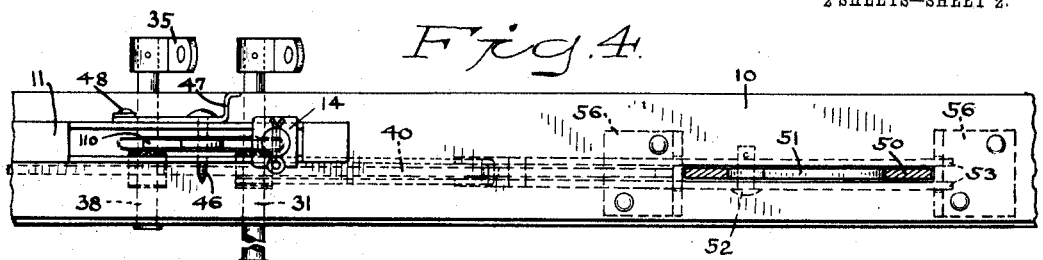
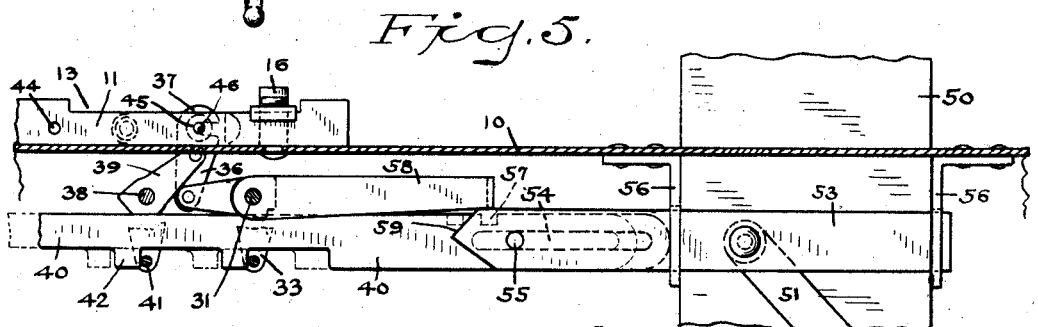
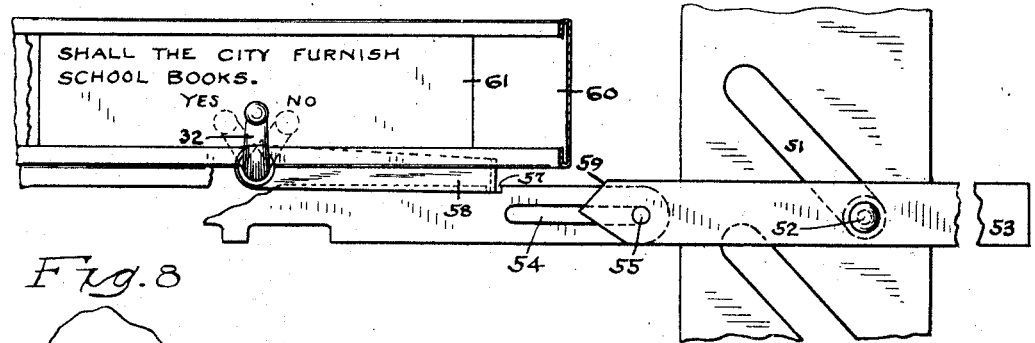
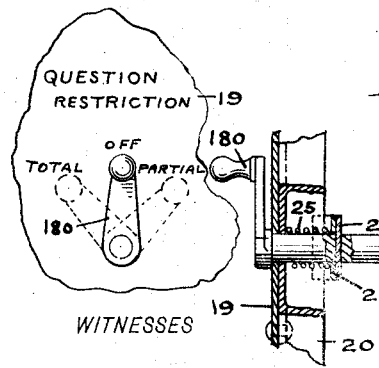
WITNESSES
H. A. Lamb.
S. W. Atherton.
INVENTOR
Charles C. Abbott
BY
A. M. Wooster
ATTORNEY

UNITED STATES PATENT OFFICE.

CHARLES C. ABBOTT, OF PITTSFIELD, MASSACHUSETTS, ASSIGNOR TO TRIUMPH VOTING MACHINE COMPANY, OF PITTSFIELD, MASSACHUSETTS, A CORPORATION OF NEW JERSEY.

QUESTION-VOTING MECHANISM.

No. 873,826.   Specification of Letters Patent.   Patented Dec. 17, 1907.

Application filed May 20, 1907. Serial No. 374,608.

*To all whom it may concern:*

Be it known that I, CHARLES C. ABBOTT, a citizen of the United States, residing at Pittsfield, county of Berkshire, State of Massachusetts, have invented a new and useful Question-Voting Mechanism, of which the following is a specification.

This invention has for its object to provide simple and convenient question mechanism for voting machines that will also enable the restricting principle to be applied to question voting.

Voting machines for general use are required to be provided with a plurality of question voting members which enable voters to vote yes or no upon questions submitted. It not infrequently happens, however, that restricted voters are entitled to vote upon certain of the questions submitted and not upon others. In order to meet this condition I have devised restricting mechanism which operates in connection with the question voting mechanism.

In the accompanying drawings forming a part of this specification, similar reference characters are used to indicate like parts in the several views.

Figures 1 and 4 on Sheets 1 and 2 respectively are to be read together, Fig. 1 being a plan view of the left end of my novel question restricting mechanism and a support therefor, and Fig. 4 a plan view of the right end thereof, the controlling lever and question restricting bar being shown in the restricting position; Fig. 1 showing a question voting mechanism in the voting position, and Fig. 4 showing a question voting mechanism in the restricted position. Figs. 2 and 5 are front elevations corresponding respectively with Figs. 1 and 4, the support being in section in each view, the cam bar being at its lowered position in Fig. 5 and the double link at the unlocking position. Fig. 3 is a front elevation corresponding with Fig. 2 except that the mechanism is locked against question voting. Fig. 6 a front elevation corresponding with Fig. 5, the cam bar being at the raised position and the resetting bar at the extreme of its movement toward the right and locked in that position. Fig. 7 a detail cross section of the machine as seen from the left in Figs. 1 and 2, with the exception that the controlling lever is shown in position for question voting; Fig. 8 is a detail elevation of the back plate and controlling lever as seen from the left in Fig. 7.

10 denotes a support which extends longitudinally of the machine and is shown as made from sheet metal and of inverted U-shape in cross section. 11 denotes the question restricting bar which is likewise made from sheet metal and of inverted U-shape in cross section. Portions of the top of bar 11 are cut away leaving two sets of recesses therein which are indicated respectively by 12 and 13. The bar is retained in place, but is permitted to slide longitudinally upon support 10 by means of cap plates 14 which lie in recesses 12 (and in the right recess 13) and are provided with side flanges 15 which engage the outer sides of the bar. 16 denotes studs which are riveted in the support and lie between the sides of bar 11 and extend through holes in the cap plates, the cap plates being retained in place by pins 17 passing through the studs above the plates. 18 denotes a controlling shaft which is journaled in support 10 and in the back plate of the machine, indicated by 19, and is provided with an operating lever 180 which I term the controlling lever. 20 denotes a vertical support which is likewise made U-shaped and is secured to the back plate. Shaft 18 passes through support 20 and through a cap plate 21 having side flanges 22 which engage the outer sides of support 20. Cap plate 21 is provided with a central vertical groove 23 which is adapted to be engaged by a pin 24 passing through shaft 18. A spring 25 lying within the vertical support and bearing against the bottom of said support and the cap plate acts to force the cap plate outward so that when pin 24 is brought into alinement with groove 23 the spring will force the cap plate outward and the pin will engage the groove, thereby retaining shaft 18 in the question voting position, as in the full line position in Fig. 8 and in Fig. 7. The left end of question restricting bar 11 is shown as made narrower, that is, the sides are brought closer together. This, however, is an unimportant detail of construction.

26 denotes an arm which is rigidly secured to shaft 18. This arm is shown as formed from a blank of sheet metal doubled upon itself at its mid-length. The two sides of the arm are provided with holes to receive the shaft and the arm is locked in place on the shaft by a key 27.

28 denotes a stop piece which is made integral with or rigidly secured to arm 26 and extends laterally therefrom and forwardly from the vertical plane thereof. The function of this stop piece is to lock the resetting bar (presently to be described) against movement toward the left, as seen in Fig. 1, and thereby prevent question voting. Question restricting bar 11 is connected to arm 26 by means of a link 29 pivoted to said arm and bar respectively.

30 denotes question voting members as a whole. Each question voting member comprises a shaft 31 journaled in support 10, a question voting lever 32 which may be formed integral therewith or rigidly secured thereto, a resetting arm 33, a connecting arm 34 and a counter dog 35. The resetting arms and connecting arms may be formed from blanks of sheet metal, bent upon themselves at their mid-length, and may be secured to the shafts by keys 27 or in any ordinary or preferred manner. The branches of the connecting arms are shown as inclosing and as pivoted to links 36 having formed integral therewith hooks 37 which extend upward and pass through clearance slots 110 in the support and through recesses 13.

38 denotes secondary shafts journaled in support 10 and each carrying a resetting arm 330, a counter dog 35 and a connecting arm 39 which is set upon the shaft at a different angle from the connecting arm 34 on shaft 31 and is pivoted to a link 36 at a different point from the arm 34. The branches of the resetting arms inclose a resetting bar 40 and are provided at their lower ends with cross pins 41 which are adapted to engage angular projections 42 on the resetting bar. The resetting bar is supported by slotted studs 43, one only being shown, which are riveted in and depend from support 10.

44 and 45 denote transverse holes in question restricting bar 11 which are adapted to be engaged by headed pins 46.

47 denotes a spring latch pivoted to one side of bar 11 as at 48. This latch is provided with a cup 49 which receives the head of a pin 46 and retains the pin in place, as clearly shown in Fig. 1. When a pin is in a hole 44 it performs no function whatever, these holes being merely provided to retain the pins when not in use and so that they will always be handy when required. When a pin is removed from a hole 44 and placed in a hole 45, the latch is turned in the opposite direction and the cup placed over the head of the pin to retain the latter in place, as shown in Figs. 4 and 5.

Turning now to Figs. 4, 5 and 6, 50 denotes a vertically movable cam bar which is moved downward by operating mechanism and intermediate connections (not shown) actuated by every voter before performing the voting operation and is moved upward by said operating mechanism and connections (which also perform the operation of counting) to reset the voting mechanism when actuated by the voter after the voting operation. The cam bar is provided with an oblique slot 51 which is inclined downward from left to right and is engaged by a stud 52 carried by a double link 53. In the present instance, the stud is shown as carrying an anti-friction roller. At the right end of the resetting bar is a slot 54 which is engaged by a cross pin 55 extending between the parts of the double link. The double link rests in slots in brackets 56 which are rigidly secured to and depend from support 10. These brackets also serve as side guides for the cam bar. The top of resetting bar 40 is provided with a locking notch 57 which is adapted to be engaged by a locking latch 58 pivoted on the shaft of the last question voting member toward the right. The forward ends of the parts of link 53 are provided with inclines 59 which when the link is moved toward the left by the downward movement of the cam bar pass under the latch, raise it and disengage it from notch 57, as clearly shown in Fig. 6.

60 denotes a ballot strip holder which is formed from sheet metal with the edges turned over toward each other to inclose a ballot strip indicated by 61. The ballot strip holders are retained in position in any suitable manner as by attachment to brackets 62 (see Fig. 7).

It will, of course, be understood that any number of question mechanisms may be provided in a voting machine, and that provision must be made for voting "yes" or "no" upon each question submitted, for locking all of the question mechanisms out of operation, as at an election when no questions are submitted, and for preventing restricted voters from voting upon certain questions.

The operation is as follows: When controlling lever 180 is in the position shown in Fig. 7 and in full lines in Fig. 8, the machine is ready for question voting. Each voter may vote "yes" or "no" upon every question submitted by swinging question voting lever 32, which is shown in full lines in the nonvoting position in Fig. 6, toward the right or left as may be. In the present instance I have indicated by dotted lines that a voter would swing lever 32 toward the left to vote "yes" and toward the right to vote "no". Where there is to be no question voting controlling lever 180 is swung from the full line position in Fig. 8 to the dotted position toward the left, which locks the parts against question voting. Should a restricted voter desire to vote, the controlling lever would be moved from the full line position in Fig. 8 to the dotted position toward the right, the effect of which will be to apply the restriction and prevent the restricted voter from voting upon a prohibited question. For convenience I have shown the back plate of the machine as bearing the words "off", "total" and "partial" to indicate the position of the controlling lever when the question mechanism is on ready for question voting, or when there is no question voting, or when question voting is on but is restricted. The controlling lever is retained in the question voting position by means of spring 25 which causes the engagement of the pin in the controlling shaft with the groove in cap plate 21.

Figs. 1 and 2 illustrate the position of the parts when the controlling lever is in the partial restricting position, that is the dotted position toward the left in Fig. 8. Suppose now that a voter desires to vote "no" upon a question submitted. He will move the corresponding question voting lever 32 from the position shown in full lines in Figs. 2 and 6 to the position shown in dotted lines at the right. This movement of lever 32 will swing resetting arm 33 on shaft 31 toward the left from the position shown in full lines in Fig. 2 to the position shown in dotted lines, and through the engagement of cross pin 41 with the corresponding projection 42 on resetting bar 40 will move said bar toward the left, as indicated by dotted lines. Should the voter desire to vote "yes" instead of "no" he would swing question voting lever 32 toward the left, as indicated by dotted lines in Fig. 6. The effect of this movement would be to cause connecting arm 34 to swing downward from the position shown in Fig. 2, which would move link 36 downward and by means of connecting arm 39 would oscillate secondary shaft 38 which carries a resetting arm 330 similar to the resetting arm on shaft 31. The cross pin 41 on the resetting arm would engage the corresponding projection 42 on resetting bar 40 and would move said bar toward the left the same as before, the only difference being that in voting "no" the resetting bar is actuated by the resetting arm on question voting member shaft 31, and in voting "yes" it is actuated by the resetting arm on secondary shaft 38. In voting "no" link 36 is raised by arm 34, said link moving freely in clearance slot 110 in support 10 and in recess 13 in restricting bar 11. In voting "yes", link 36 is drawn downward by arm 34. The necessary movement of link 36 connecting arm 39 and the secondary shaft in voting "no" performs no function whatever.

The fact that link 36 and hook 37 must move vertically in ordinary question voting is incidental only, but said movement becomes of vital importance in the restriction of question voting, as will presently be fully explained. In practice, there are two counters corresponding with each question voting member, one to count the votes "yes", the other to count the votes "no". Each voting member shaft 31 and secondary shaft 38 carries a counter dog 35 which is adapted to engage the corresponding counter, not shown, as the counting operation specifically forms no portion of the present invention. If the voter votes "no", the counter dog upon the corresponding voting member shaft 31 is caused to engage its corresponding counter, and if the voter votes "yes" the counter dog upon the secondary shaft 38 is caused to engage its corresponding counter. It will, of course, be understood that the question voting mechanisms are duplicates of each other. Where there is no restriction of question voting and all voters are allowed to vote upon all questions submitted, the controlling lever would, of course, be at the position shown in Fig. 7, and in full lines in Fig. 8. It is only when a portion of the voters are restricted against voting upon certain questions submitted that the controlling lever is moved to the position shown in Fig. 1 and to the dotted position at the right in Fig. 8. Where there is no restriction of question voting, the headed pins 46 have no function and may be placed in holes 44 in the question restricting bar and retained there by cupped latch 47. Suppose now that it is desired to restrict certain of the voters against voting upon a question submitted. The corresponding latch 47 is disengaged from the headed pin, as it is shown in Fig. 1, and the pin is passed through the contiguous hole 45 in the question restricting bar and is locked there by placing the cup of the latch over the head, as is clearly shown in Fig. 4, which see in connection with Fig. 5. When a restricted voter goes to the machine, the custodian operates the controlling lever and moves it from the full line position in Fig. 8 to the dotted position at the right in Fig. 8, which is also the position shown in Fig. 1. This moves arm 26 from its normal position, which is approximately vertical, to the position shown in Fig. 2 and moves question restricting bar 11 toward the left. This movement of the question restricting bar places any of the pins 46 which may have been placed in the restricting position—that is, in holes 45 in the question restricting bar—in engagement with the corresponding hooks 37 upon links 36, as clearly shown in Figs. 4 and 5. The effect of this engagement of a pin 46 with a hook 37 is to lock the corresponding link 36 against vertical movement in either direction, so that when a pin is in engagement with a hook, the corresponding question voting member shaft will be locked against oscillation in either direction, it having been already explained that in order to vote "no" it would be necessary for link 36 to be moved upward, and in order to vote "yes" it would be necessary for said link to be moved downward.

Suppose now that there is to be no question voting. The custodian moves controlling lever 180 from the full line position in Fig. 8 to the dotted position at the left in said figure, the effect of which is to move arm 26 to the position shown in Fig. 3 and place stop piece 28 in the path of resetting bar 40 so that there can be no movement of said bar toward the left as is required in any question voting. This will be readily understood from Fig. 3, which see in connection with Fig. 2, the voting position of the resetting bar being indicated by dotted lines at the left in Fig. 2. When, however, arm 26 and stop piece 28 are thrown to the position shown in Fig. 3, the resetting bar is locked at its extreme position toward the right and all of the question voting members are locked at their normal or non-voting position through the engagement of projections 42 on the resetting bar with cross pins 41 in the resetting arms. It will be noted that the left end of the resetting bar is beveled downward toward the left. This is simply to provide clearance for the stop piece in swinging to the locking position as in Fig. 3, thus preventing any lost motion of the resetting bar.

The normal or locked position of the parts is shown in Fig. 6. The cam bar is at its raised position, the double link and the resetting bar are at their extreme position toward the right and the resetting bar is locked by the engagement of latch 58 with locking notch 57 therein. Before each voting operation, the voter actuates operating mechanism which by means of intermediate connections (not shown) moves the cam bar downward from the position shown in Fig. 6 to the position shown in Fig. 5. As the cam bar moves downward, stud 52 will pass to the upper end of slot 51 and will move the double link toward the left from the position shown in Fig. 6 to the position shown in Fig. 5. The inclines 59 upon the double link will engage the locking latch and raise it out of notch 57, leaving the resetting bar unlocked and ready for the voting operation. The first question voting operation, whether the vote be "yes" or "no", will move the resetting bar from the position shown in full lines in Figs. 2 and 5 to the position indicated by dotted lines in said figures. It will, of course, be understood that additional question voting operations will have no effect upon the resetting bar, although each question voting operation will actuate one of the resetting arms 33 in the manner already described. After the completion of the voting operation, the voter actuates operating mechanism which by means of intermediate connections (not shown) moves the cam bar upward from the position shown in Fig. 5 to the position shown in Fig. 6. This causes stud 52 to pass to the lower end of slot 51, the effect of which is to move the double link toward the right from the position shown in Fig. 5 to the position shown in Fig. 6, and through the engagement of cross pin 55 with slot 54 in the resetting bar, to draw said bar toward the right also. As the resetting bar moves toward the right, the projections 42 thereon will be moved from the dotted position in Figs. 2 and 5 to the full line position in said figures, and through the engagement of said projections with the cross pins 41 in the actuated resetting arms, will return all actuated resetting arms, and with them the question voting members, to the normal or non-voting position, which will disengage all engaged counter dogs from the corresponding counters, and the resetting bar and with it all question voting members will be locked in the non-voting position by the engagement of latch 58 with the locking notch 57 in the resetting bar.

Having thus described my invention, I claim:

1. In a voting machine, the combination with a question voting member comprising a shaft, a connecting arm and a counter dog, of a secondary shaft carrying a connecting arm and a counter dog, a link to which said arms are pivoted and means for resetting said shafts after a voting operation.

2. In a voting machine, the combination with a question voting member comprising a shaft, a connecting arm, a resetting arm and a counter dog, and a secondary shaft carrying a connecting arm, a resetting arm and a counter dog, of a link to which the connecting arms are pivoted and a resetting bar which is engaged by the resetting arms.

3. In a voting machine, the combination with a question voting member comprising a shaft, a connecting arm, a resetting arm and a counter dog, and a secondary shaft carrying a connecting arm, a resetting arm and a counter dog, of a link to which the connecting arms are pivoted and a resetting bar having angular projections which are engaged by the resetting arms.

4. In a voting machine, the combination with a question voting member comprising a shaft, a connecting arm, a resetting arm and a counter dog, and a secondary shaft carrying a connecting arm, a resetting arm and a counter dog, said connecting arms being formed from blanks of sheet metal bent upon themselves and secured to the shafts at their mid-lengths, of a link lying between the branches of the connecting arms and pivoted thereto and a resetting bar which is engaged by the resetting arms.

5. In a voting machine, the combination with a question voting member comprising a shaft, a connecting arm, a resetting arm and a counter dog, and a secondary shaft carrying a connecting arm, a resetting arm and a counter dog, said resetting arms being formed from blanks of sheet metal bent upon themselves and secured to the shafts at their mid-length, and the ends of the branches being provided with a cross pin, of a link to which the connecting arms are pivoted and a resetting bar lying between the branches of the resetting arm and provided with angular projections which are engaged by the cross pins.

6. In a voting machine, the combination with a question voting member comprising a shaft and a connecting arm, of a secondary shaft carrying a connecting arm, a link to which said arms are pivoted and means for resetting said shafts after the voting operation.

7. In a voting machine, the combination with a question voting member comprising a shaft and a connecting arm, and a secondary shaft carrying a connecting arm, of a link to which said arms are pivoted, and which is provided with a hook and a question restricting bar having means for engagement by said hook, substantially as described, for the purpose specified.

8. In a voting machine, the combination with a question voting member comprising a shaft and a connecting arm, and a secondary shaft carrying a connecting arm, of a link to which said arms are pivoted, and which is provided with a hook and a question restricting bar having transverse holes and a removable pin adapted to engage said holes and to be engaged by the hook, substantially as described, for the purpose specified.

9. In a voting machine, the combination with a question voting member comprising a shaft, a connecting arm and a resetting arm and a secondary shaft carrying a connecting arm and a resetting arm, of a link to which the connecting arms are pivoted, a resetting bar having means for engagement by the resetting arms and a locking notch, a latch engaging said notch to lock the resetting bar in the non-voting position and means for disengaging said latch to unlock the resetting bar.

10. In a voting machine, the combination with a question voting member comprising a shaft, a connecting arm and a resetting arm and a secondary shaft carrying a connecting arm and a resetting arm, of a link to which the connecting arms are pivoted, a resetting bar having means for engagement by the resetting arms, a locking notch and a slot, a latch engaging said notch to lock the bar in the non-voting position, a cam bar having an oblique slot, a stud in said slot and a double link by which said stud is carried and which is provided with a cross pin engaging the slot in the resetting bar, movement of the cam bar in one direction carrying the double link and with it the resetting bar, if it has been actuated, toward the right and permitting the latch to engage the notch to lock the resetting bar in the non-voting position and movement of the cam bar in the opposite direction carrying the double link toward the left and causing it to disengage the latch from the notch, leaving the resetting bar unlocked.

11. In a voting machine, the combination with a resetting bar having a locking notch and a slot and a locking latch adapted to engage said notch, of a cam bar having an oblique slot, a stud in said slot, a link by which said stud is carried and which is provided with an incline and a pin engaging the slot in the resetting bar, substantially as described, for the purpose specified.

12. In a voting machine, the combination with a question voting member comprising a shaft, a connecting arm and a resetting arm and a secondary shaft carrying a connecting arm and a resetting arm, of a link to which the connecting arms are pivoted, a resetting bar having means for engagement by the resetting arms, means for locking the resetting bar in the non-voting position after a voting operation and for unlocking the resetting bar before a voting operation and means for locking the resetting bar against question voting.

13. In a voting machine, the combination with a question voting member comprising a shaft, a connecting arm and a resetting arm and a secondary shaft carrying a connecting arm and a resetting arm, of a link to which the connecting arms are pivoted, a resetting bar having means for engagement by the resetting arms and means for locking the resetting bar against question voting.

14. In a voting machine, the combination with a question voting member comprising a shaft, a connecting arm and a resetting arm and a secondary shaft carrying a connecting arm and a resetting arm, of a link to which the connecting arms are pivoted, a resetting bar having means for engagement by the resetting arms, a controlling shaft and a stop piece carried thereby which is adapted to be placed in the path of movement of the resetting bar when the latter is in the non-voting position to lock said bar against movement and prevent question voting.

15. In a voting machine, the combination with question voting mechanism and a resetting bar adapted to be engaged thereby, of a controlling shaft carrying a stop piece adapted to be placed in the path of movement of the resetting bar when the latter is in the non-voting position to prevent question voting.

16. In a voting machine, the combination with question voting mechanism and a resetting bar adapted to be engaged thereby, of a controlling shaft carrying a stop piece adapted to be placed in the path of movement of the resetting bar when the latter is in the non-voting position to prevent question voting and means for retaining the controlling shaft in position to permit question voting.

17. In a voting machine, the combination with question voting mechanism and a resetting bar adapted to be engaged thereby, of a controlling shaft carrying a stop piece adapted to be placed in the path of movement of the resetting bar when the latter is in the non-voting position to prevent question voting, a U-shaped vertical support through which the shaft passes, a cap plate engaging the vertical support and having a vertical groove, a pin passing through the controlling shaft and a spring within the support and bearing against the cap plate to force the latter outward and place the groove in engagement with the pin when said groove and pin are in alinement and retain the controlling shaft in the question voting position.

18. In a voting machine, the combination with a question voting member having a connecting arm and a secondary shaft also having a connecting arm, of a link to which the connecting arms are pivoted and which is provided with a hook and a question restricting bar which is provided with means for engagement by the hook to prevent operation of the question voting mechanism.

19. In a voting machine, the combination with a question voting member having a connecting arm, a secondary shaft also having a connecting arm and a link to which the connecting arms are pivoted and which is provided with a hook, of a question restricting bar provided with means for engagement by the hook, for the purpose set forth, and a controlling shaft to which said bar is connected.

20. In a voting machine, the combination with a question voting member having a connecting arm, a secondary shaft also having a connecting arm and a link to which the connecting arms are pivoted and which is provided with a hook, of a question restricting bar provided with a transverse hole, a pin adapted to engage said hole and to be engaged by the hook to restrict question voting and means for imparting longitudinal movement to the question restricting bar.

21. In a voting machine, the combination with a plurality of question voting members each having a connecting arm, secondary shafts also having connecting arms and links to which the connecting arms are pivoted and which are provided with hooks, of a question restricting bar provided with holes, removable pins adapted to engage said holes and to be engaged by the hooks, for the purpose set forth, a controlling shaft having an arm and a link connecting the question restricting bar to said arm.

22. In a voting machine, the combination with a plurality of question voting members each having a connecting arm and a resetting arm, secondary shafts also having connecting arms and resetting arms, links to which the connecting arms are pivoted and which are provided with hooks and a resetting bar having means for engagement by the resetting arms, of a question restricting bar provided with holes, removable pins adapted to engage said holes and to be engaged by the hooks, a controlling shaft having an arm and a stop piece adapted to be placed in the path of movement of the resetting bar and a link connecting the question restricting bar to the arm, said controlling shaft in its normal position permitting question voting, when turned in one direction preventing question voting by locking the resetting bar and when turned in the opposite direction restricting question voting through the engagement of pins in the restricting bar with the hooks.

23. In a voting machine, the combination with a plurality of question voting members each comprising a shaft, a lever, a connecting arm and a resetting arm, secondary shafts having connecting arms and resetting arms, links to which the connecting arms are pivoted and which are provided with hooks and a resetting bar having means for engagement by the resetting arms, of a question restricting bar provided with holes, removable pins adapted to engage said holes and to be engaged by the hooks, means for actuating the question restricting bar to restrict question voting and means for locking said bar to prevent question voting.

24. In a voting machine, the combination with a plurality of question voting members, each comprising a shaft, a connecting arm and a resetting arm, secondary shafts having connecting arms and resetting arms and links to which the connecting arms are pivoted, of a resetting bar having projections adapted to be engaged by one set of resetting arms when the question voting member is actuated to vote "yes" and by the other set of resetting arms when the question voting member is actuated to vote "no", the actuated restricting arms being engaged by said angular projections to reset the question voting members after each voting operation.

25. In a voting machine, the combination with a plurality of question voting members each comprising a shaft, a connecting arm and a resetting arm, secondary shafts having connecting arms and resetting arms and links to which the connecting arms are pivoted and which are provided with hooks, of a resetting bar having projections adapted to be engaged by one set of resetting arms in voting "yes" and by the other set of resetting arms in voting "no" and a question restricting bar having removable pins adapted to be engaged by the hooks to lock engaged hooks against movement and thereby restrict question voting.

26. In a voting machine, the combination with a plurality of question voting mechanisms each adapted to vote "yes" and "no" and a resetting bar, for the purpose set forth, of a question restricting bar adapted to be engaged by question voting mechanisms, a controlling shaft having an arm and a stop piece and a link connecting said arm with the question restricting bar, substantially as described, for the purpose specified.

27. In a voting machine, the combination with a plurality of question voting mechanisms each adapted to vote "yes" and "no" and a resetting bar, for the purpose set forth, of a question restricting bar adapted to be engaged by question voting mechanisms, of a controlling shaft having an arm and a stop piece adapted to engage the resetting bar, a link connecting said arm with the question restricting bar and means for retaining said shaft in the non-restricting position.

In testimony whereof I affix my signature, in presence of two witnesses.

CHARLES C. ABBOTT.

Witnesses:
   Geo. O. B. Hawley,
   Charles H. Pitney.